Figure 3:
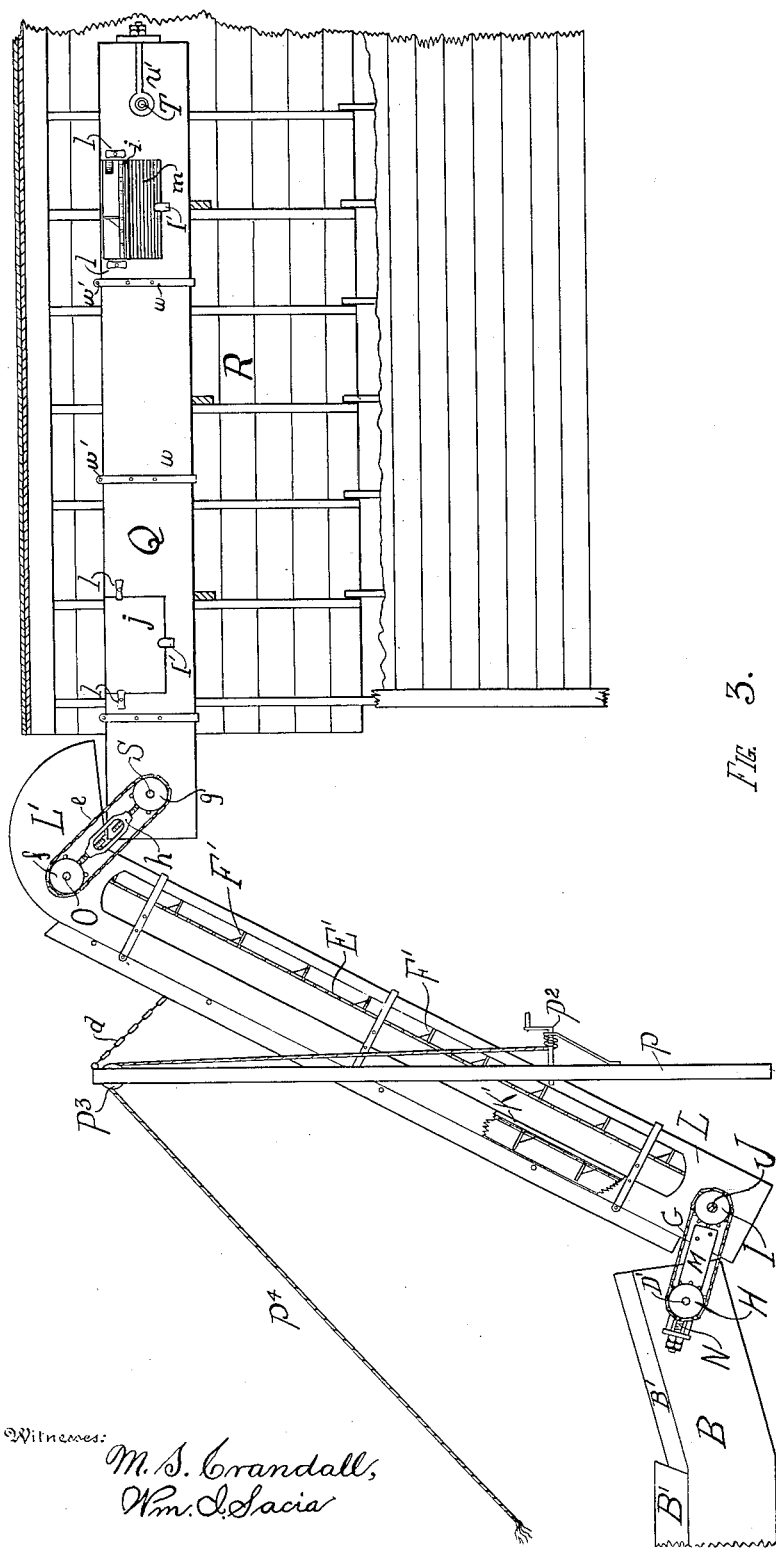

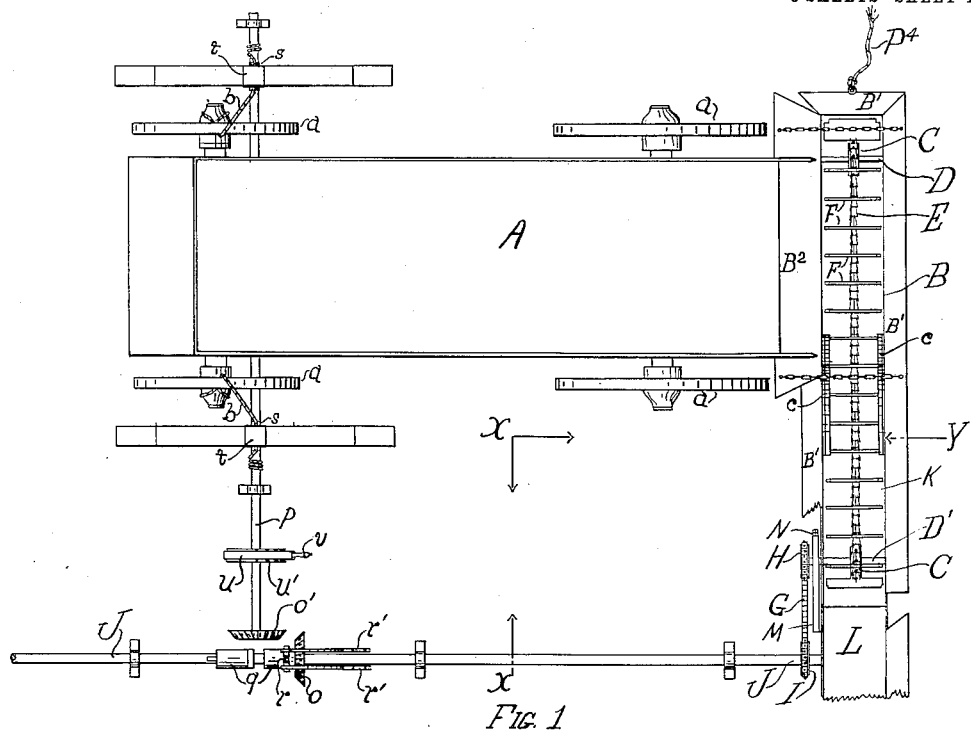
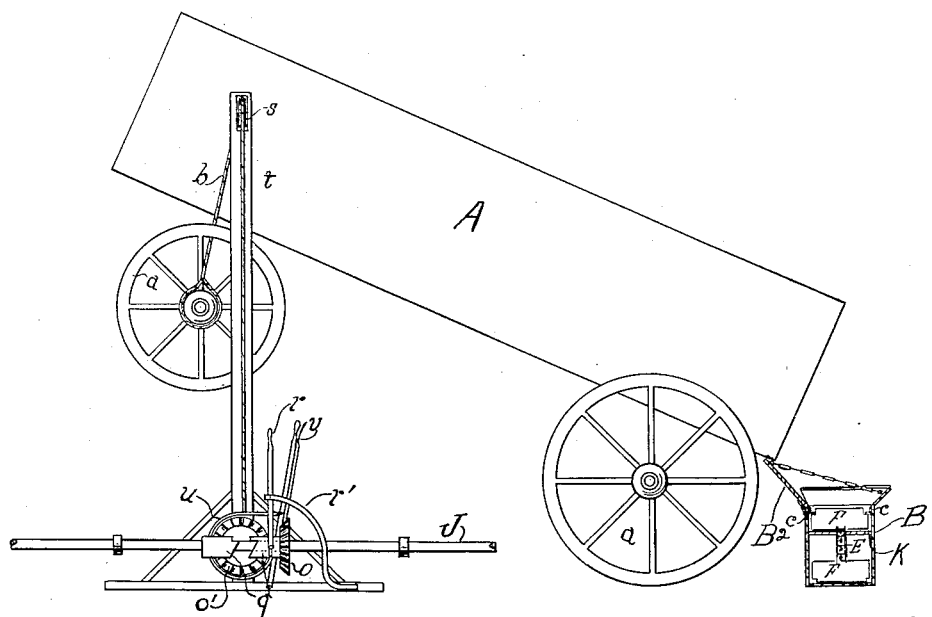

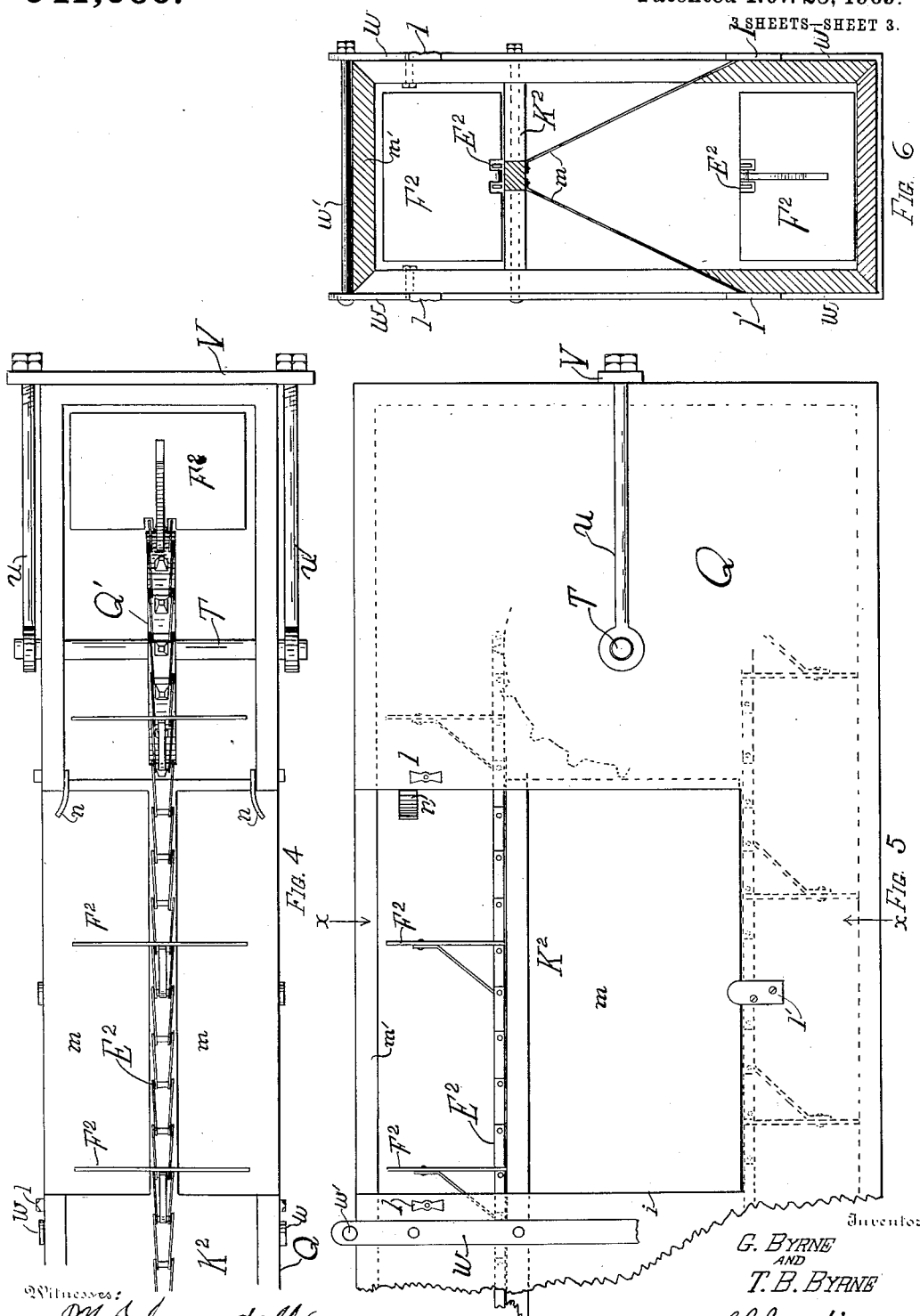

UNITED STATES PATENT OFFICE.

GEORGE BYRNE AND TRUE B. BYRNE, OF AKRON, IOWA.

GRAIN-CONVEYER.

941,060.

Specification of Letters Patent. Patented Nov. 23, 1909.

Application filed April 19, 1909. Serial No. 490,885.

*To all whom it may concern:*

Be it known that we, GEORGE BYRNE and TRUE B. BYRNE, citizens of the United States, residing at Akron, in the county of Plymouth and State of Iowa, have invented new and useful Improvements in Grain-Conveyers, of which the following is a specification.

Our invention relates to conveyers of grain, and the object of the invention is to provide means for conveying grain direct from a wagon to a bin wherever the bin may be located without the use of shovels, scoops or other hand devices. In this connection it is necessary to employ both horizontal and upright carriers, if the grain is to be conveyed some distance before being elevated.

We have illustrated our invention in the accompanying drawing in which—

Figure 1 is a plan view of wagon and a portion of conveyer and gears for operation. Fig. 2 is a view in side elevation of wagon and gears partly in section on line $x$—$y$, Fig. 1. Fig. 3 is a view in side elevation of conveyer, a part of the elevator portion being broken away, the upper section of the conveyer being adjusted for delivery to the upper part of a bin. Fig. 4 is an enlarged plan view of upper section of conveyer with cover removed. Fig. 5 is a view of Fig. 3 in side elevation. Fig. 6 is a cross-section on line $x$—$x$, Fig. 5.

In the drawing A is an ordinary wagon with the usual wheels $a$. The loaded wagon is driven under the horizontal part of the carrier frame which is raised to receive it, and the front end elevated by pulley ropes $b$ attached to the hubs, the grain falling from the inclined box into the carrier which may be set on the ground or raised on trestles, or suspended by a rope as shown. The carrier is an inclosed box or frame B open at the top to receive the grain, having wings or side pieces B' and B² to prevent spilling. At the ends are sprocket wheels C secured to shafts D and D' adapted to revolve in suitable bearings in the frame. The sprocket wheels are adapted to carry an endless central chain E to which are secured the drags F. The chain and drags are run by a chain G on the sprocket wheel H secured to the shaft D' and the sprocket wheel I secured to a shaft J. The top of the chain and the bottom of the drags when carrying are adapted to pass over the floor K of the carrier.

The shaft J revolves in bearings in the lower end of the frame L of the upright carrier or elevator into which the carrier B empties. The latter is curved upwardly at this end to meet the elevator, and angle irons $c$ are secured to the upper edges of the side pieces of the carrier B when the same curves in order to hold the drags to the floor at this place. The shaft D' at the rear of the carrier B is mounted in a forked beam M secured to the elevator L, the forked end of the beam bearing an eye-bolt N by which the tension of the chain G may be adjusted.

The frame L of the elevator is similar to that of the carrier. It is provided with a similar central chain E' and drags F' which are run by the shaft J and a shaft O at the upper end over a similar floor K' and sprocket wheels. The elevator is supported on either side by a post P to the upper end of which is attached a chain $d$ secured to the upper end of the elevator. The post is also provided with a windlass P² and pulley P³ for operating the rope P⁴ supporting the frame B. As the rope is wound upon the windlass the free end of the carrier is raised for the wagon to be driven under, the other end being pivotally supported on the shaft D'. When the wagon is in place the carrier is lowered by the same process. The frame of the latter is provided with an integral hood which guides the grain either into a bin or hopper or into an upper carrier Q which feeds laterally into the bins.

After the grain is elevated it is often necessary or desirable to carry it some distance for delivery into bins removed from or inaccessible to the elevator. We have provided for this by an upper horizontal carrier. It is shown in Fig. 3 supported on beams attached to the frame or rafters of a corn crib R directly underneath the roof of the crib. The grain is delivered from the elevator into the end of the carrier Q which extends out through the open end of the crib. This carrier is similar in construction to those just described except for the doors for side delivery. It has a similar chain E² supporting similar drags F² over a similar floor K². The central chain runs over sprocket wheels secured to shafts S and T, the latter bearing the sprocket wheel Q' at the outer end of the carrier. The latter shaft is supported in the eyes of bolts U, a band V connecting the two ends of the bolts. The body of the carrier is bound by side pieces W, and connecting bolts W', and has a cover $m'$.

The shaft S having a sprocket wheel carrying the chain $E^2$ is operated by a chain $e$ over sprocket wheels $f$ and $g$ on the respective shafts O and S, the two shafts being connected by a turnbuckle $h$ by which the tension of the chain is regulated.

On each side of the carrier Q are openings $i$, adapted to be fitted by shutters $j$ and secured by buttons $l$ and $l'$. Opposite the openings the floor of the carrier is cut away leaving a central strip for the support of the chain as seen in Fig. 6, and extending slantingly downward from the floor to the bottom of the openings, secured to the floor and bottom of the openings, are side pieces $m$, down which the grain falls when pushed forward by the drags. If over the bins the grain falls into them or chutes or spouts may be provided. Curved guides $n$ on the inner sides of the openings prevent corn on the ear from being caught between the drags and the sides of the openings.

The shaft J which works the conveyers, may be operated by any suitable power and is adapted for the elevation of the wagon. Near the forward end of the wagon a bevel gear $o$ is secured to the shaft and adapted to mesh with a similar gear $o'$ on a shaft $p$ at right angles to the shaft J. On the latter shaft is a clutch $q$ operated by a handle $r$ pivoted to curved bar $r'$ by which the gears may be thrown in or out of mesh. When in mesh the shaft $p$ will wind up the rope $b$ over the pulleys $s$ in the upper ends of the posts $t$, raising the wagon. The wagon is lowered by releasing the clutch and applying the brake $u$, a band encircling a wheel $u'$ on the shaft $p$, and operated by a lever $v$.

The single, central chain to which the drags are secured makes possible the side delivery of the grain through the openings in the upper carrier, and renders all places easily accessible to the conveyer.

Having described our invention, what we claim as new and desire to secure by Letters Patent, is—

1. In a grain conveyer, the combination of an elevator adjustable to the rear end of a wagon, means for its operation, a carrier into which said elevator empties, shafts at the ends of the carrier operated by the elevator mechanism, sprocket wheels centrally secured to said shafts, a central endless chain carried by said sprocket wheels, conveyers secured to said chain and means for the side delivery of the grain from the carrier to the cribs or bins, substantially as described.

2. In a grain conveyer, the combination with an elevator and means for its operation, of a frame or body, shafts at each end of the frame adapted to be operated by the elevator mechanism, sprocket wheels centrally secured to said shafts, a central endless chain in said frame carried by said sprocket wheels, drags secured to said chain, the frame having openings on the sides thereof extending above and below the floor of the frame, and the floor opposite said openings slanting from the middle outwardly to the bottom of the openings, substantially as described.

3. In a grain conveyer, the combination of a carrier adjustable underneath the rear end of a wagon, drags in said carrier for conveying the grain and adapted to be operated by suitable means, means connected with the operating means for raising and lowering the forward end of the wagon, an elevator into which said carrier empties adapted to be operated by the carrier mechanism, an upper horizontal carrier into which the elevator empties having openings in the sides thereof extending above and below the floor of the carrier, the floor of the carrier slanting outwardly to the bottom of the openings, and drags in said carrier run by a central chain operated by the elevator mechanism, substantially as described.

In testimony whereof we have signed our names to this specification in the presence of two subscribing witnesses.

GEORGE BYRNE.
TRUE B. BYRNE.

Witnesses:
WM. N. HAMM,
W. H. MORSE.